United States Patent [19]
Freize et al.

[11] 3,889,983
[45] June 17, 1975

[54] ROTARY FLUID JOINT

[75] Inventors: Ronny G. Freize, Gastonia, N.C.;
George R. Ferguson, Clover, S.C.

[73] Assignee: Duff-Norton Company, Charlotte, N.C.

[22] Filed: Apr. 15, 1974

[21] Appl. No.: 460,982

[52] U.S. Cl. ................ 285/13; 277/13; 277/135; 285/98; 285/276
[51] Int. Cl. .......................................... F16l 55/00
[58] Field of Search ........ 285/13, 14, 98, 279, 276; 277/13, 25, 67, 68, 135

[56] References Cited
UNITED STATES PATENTS

| | | | |
|---|---|---|---|
| 2,279,969 | 4/1942 | Casperson | 285/14 |
| 2,768,358 | 10/1956 | Moseley et al. | 285/276 X |
| 2,793,058 | 5/1957 | Jacobson | 285/14 X |
| 3,089,713 | 5/1963 | Scaramucci | 285/14 |
| 3,405,959 | 10/1968 | Walker | 285/375 X |
| R23,283 | 10/1950 | Browne | 285/98 |

*Primary Examiner*—Dave W. Arcia
*Attorney, Agent, or Firm*—Parrott, Bell, Seltzer, Park & Gibson

[57] ABSTRACT

A rotary fluid joint which comprises a housing having a passageway therethrough for the flow of pressurized fluid, a conduit having an inner end portion mounted within the housing in fluid communication with the passageway, bearing means mounted in the housing and surroundingly engaging the conduit to permit rotational movement of the conduit in the housing, sealing means cooperating with the housing and the inner end of the rotatable conduit for preventing substantial leakage of pressurized fluid between the conduit and the housing, and slinger means mounted for rotation with the rotatable conduit between the bearing means and the sealing means for deflecting away from the bearing means such fluid as may leak past the sealing means to thereby protect the bearing means from contact by the fluid.

9 Claims, 3 Drawing Figures

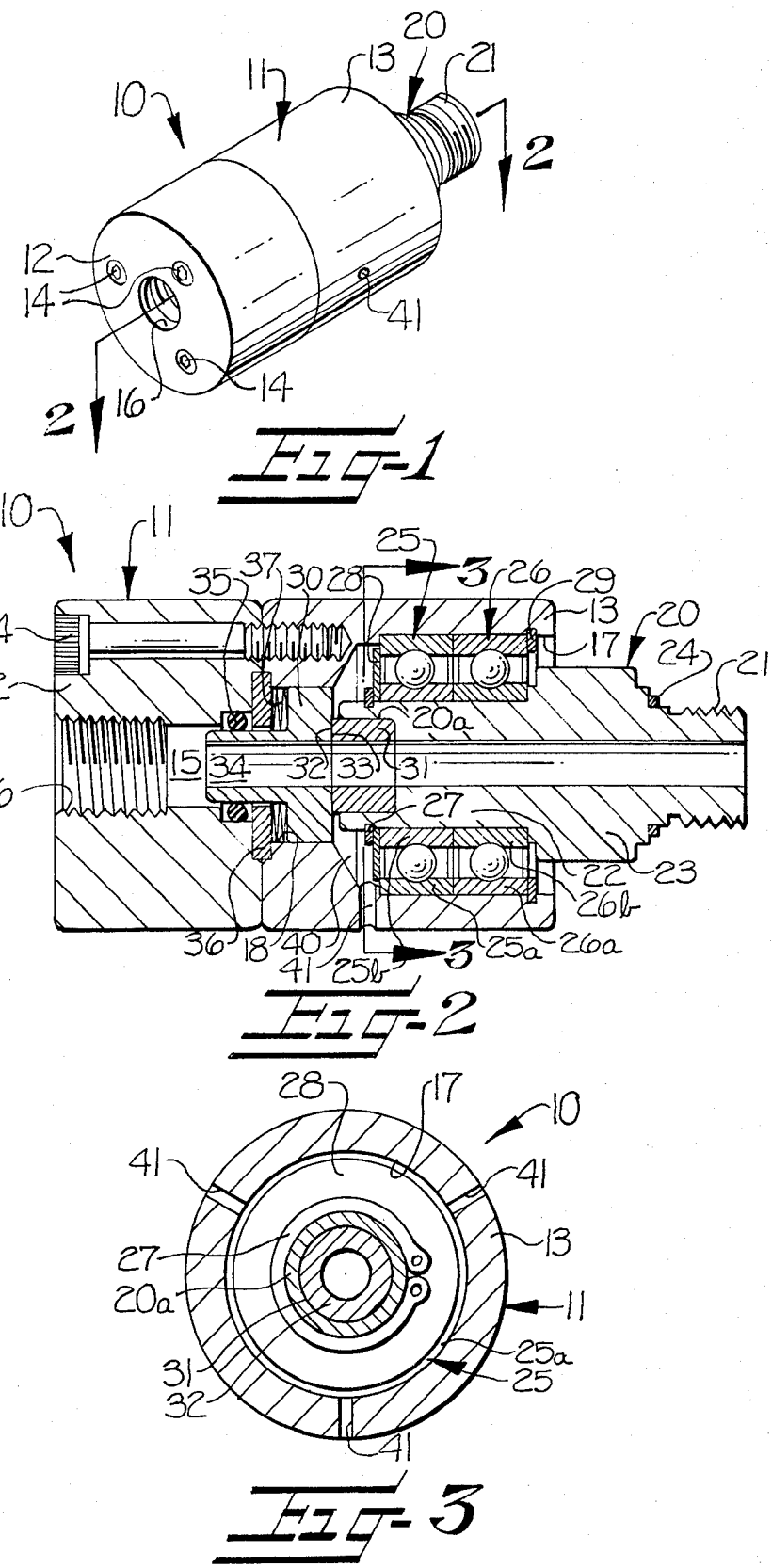

ROTARY FLUID JOINT

Numerous rotating connectors or joints having various arrangements of fluid seals therein have been proposed for providing a fluid-tight seal at the juncture between a rotating and a non-rotating fluid conduit. While many of the known types of rotary fluid joints perform adequately under moderate conditions of use, they have proved generally unsatisfactory where the rotary fluid joint operates under extreme conditions of rotational speed and pressure. Under extreme conditions of 10,000 RPM and 1000 p.s.i., for example, some amount of fluid leakage usually occurs in these joints. This leakage has presented a particular maintenance problem since the leakage inevitably enters the antifriction bearings of the rotary joint and destroys the bearings in a very short time. This necessitates frequent maintenance and replacement of the seals and bearings in the rotary fluid joints.

It is therefore an object of this invention to provide an improved rotary fluid joint which eliminates the maintenance problems described above.

More specifically, it is an object of this invention to provide a rotary fluid joint particularly adapted for operating under extreme conditions of rotational speed and pressure and which eliminates the above-noted problem of short bearing life by preventing any leakage which may pass the seal face of the rotary joint from reaching the bearings thereof and destroying the same.

It is another object of this invention to provide a rotary fluid joint of the type described wherein an improved seal arrangement is provided for maintaining a tight fluid seal in the joint and for compensating for wear of the seal elements.

In accomplishing the objects of this invention, means is provided in the rotary fluid joint between the bearings thereof and the sealing means where leakage may occur for preventing any fluid leakage passing the sealing means from reaching the bearings. A circular disk mounted for rotation with the rotating element of the rotary fluid joint is located in the path of the fluid leakage from the sealing means toward the bearings for intercepting the leakage and deflecting the same radially outwardly from the rotating element and away from the bearings. The leakage is then permitted to drain from the joint through vent holes suitably positioned in the housing thereof.

To maintain a tight fluid seal between the relatively moving components of the rotary fluid joint under the extreme operating conditions for which the joint is intended, and to compensate for any wear of the contacting sealing surfaces in the joint, the sealing means of the rotary joint comprises a cooperating pair of sealing elements having opposing mutually contacting seal surfaces, with one of the sealing elements being axially movable and biased axially into tight engagement with the other sealing element by suitable spring means.

Some of the objects and advantages of the invention having been stated, others will appear as the description proceeds, when taken in connection with the accompanying drawings, in which FIG. 1 is a perspective view of a rotary fluid joint in accordance with the present invention;

FIG. 2 is a sectional view through the rotary fluid joint, taken generally along the line 2—2 in FIG. 1; and FIG. 3 is a sectional view through the rotary fluid joint, taken generally along the line 3—3 in FIG. 2.

Referring now more particularly to the drawings, the eference numeral 10 generally indicates a rotary fluid joint adapted for accommodating rotary relative motion between two pipelines connected therewith. The rotary fluid joint includes a cylindrical housing, generally indicated at 11, which is formed in two sections 12 and 13 and secured together by suitable fastener means such as cap screws 14. The first section 12 of the housing has a fluid passageway 15 extending axially therethrough and including a female threaded portion 16 at the outer end thereof for connecting the housing with a fluid pipeline. The second section 13 of the housing has an enlarged annular inner wall 17 at one end thereof and a relatively reduced diameter annular inner wall 18 at the opposite inner end thereof adjoining the juncture of the first and second sections 12 and 13 of housing 11.

The rotary fluid joint 10 also comprises a conduit, generally indicated at 20, which is rotatably mounted within the housing 11 and has a bore therethrough positioned in fluid communication with the fluid passageway 15 of the housing. The conduit 20 has a male threaded outer end portion 21, a cylindrical inner end portion 22 positioned within the enlarged annular inner wall 17 of the second section 13 of the housing, and an enlarged medial portion 23 between outer and inner end portions 21 and 22 defining a gripping surface for facilitating threading a pipe onto the threaded outer portion 21. Medial portion 23 is preferably of flattened or hexagonal cross-section to facilitate gripping engagement with a wrench or the like. An outer sealing ring 24 is provided at the innermost end of the threaded portion 21 to provide tight sealing engagement with a pipe connected therewith.

Conduit 20 is mounted for rotation in the housing 11 by bearing means such as antifriction bearings 25 and 26. The antifriction bearings each include an outer race 25a, 26a mounted in the enlarged annular wall 17 of the housing and corresponding inner races 25b, 26b surroundingly engaging the cylindrical inner end portion 22 of the conduit 20. The pair of antifriction bearings 25 and 26 are retained on the conduit by a locking snap ring 27 adjacent the innermost end of the conduit, with a circular disk 28, to be described more fully later, being positioned between the snap ring 27 and the innermost bearing 25. The conduit 20 and the antifriction bearings 25 and 26 positioned thereon are retained within the housing 11 by means of an outer locking snap ring 29 which is received in an annular groove suitably located in inner wall 17 adjacent the end of the housing.

In order to prevent leakage of the pressurized fluid at the juncture between the housing 11 and the conduit 20, sealing means are provided within the housing cooperating with the housing and the inner end of the rotatable conduit. The sealing means comprises first and second cooperating sealing elements 30 and 31 having opposing mutually contacting seal faces 32 and 33 for preventing substantial leakage of pressurized fluid therebetween. The first sealing element 30 is in the form of a flanged tubular member preferably formed of a wear resistant material such as high speed steel and having a radial flange formed at one end thereof defining the planar seal face 32. Sealing element 30 has a fluid passageway 34 therethrough providing fluid communication between the passageway 15 of housing 11 at one end of the sealing element 30 and conduit 20 at the opposite end of the sealing element. The sealing element 30 is mounted for axial movement in the housing, with the outer cylindrical periphery of the flanged portion of element 30 being slidably positioned with the reduced diameter annular wall 18 of the second section 13 of housing 11.

The cooperating sealing element 31 is in the form of an annular sleeve and is mounted in a counterbore 20a at the innermost end of the conduit 20. Sealing element 31 is preferably longer than the depth of counterbore 20a so that the inner exposed seal face 33 of the sealing element protrudes beyond the innermost end of the conduit 20. Sealing element 31 is preferably formed from a material such as graphite so that the seal face 33 thereof may wear slightly to conform to the surface of the cooperating seal face 32 and form a tight seal therebetween. The sealing means also includes a resilient O-ring 35 surrounding the reduced diameter end portion of tubular sealing element 30 for blocking leakage of fluid flowing along the outside of the sealing element 30.

To facilitate maintaining the sealing element 30 in proper axial alignment in the housing and to facilitate maintaining the seal faces of the elements in contact, the housing includes an annular positioning washer 36 mounted in corresponding recesses at the juncture of the first and second sections 12 and 13 of housing 11 surroundingly engaging the reduced diameter portion of the sealing element 30. Additionally, to facilitate maintaining a tight seal between the cooperating seal faces 32 and 33 and for compensating for any wear of the seal faces, spring means 37 is provided cooperating with washer 36 and with the sealing element 30 for biasing the sealing face 32 thereof axially toward and into tight engagement with the seal face 33 of sealing element 31.

Under the extreme operating conditions of this rotary fluid joint, some amount of pressurized fluid may be expected to leak past the seal faces 32, 33 and into the annular cavity 40 between the inner end portion of conduit 20 and the enlarged annular wall 17 of the housing. Since this fluid leakage is generally highly deleterious to the life of bearings such as the antifriction bearings 25 and 26, means is provided within the housing for deflecting the fluid leakage away from the bearings aand out of the housing. This is accomplished by the circular slinger disk 28 which is mounted on the inner side of the innermost antifriction bearing 25 and adapted for rotation with the inner race 25b thereof.

More particularly, disk 28 is positioned with one side thereof abutting the inner race 25b of the antifriction bearing so as to be adapted to rotate therewith. The circular disk 28 has a radial extent overlapping the major portion of the radial extent of the bearing, with the radially outermost portion of the disk terminating alongside and in closely spaced relation to the outer race 25a. Although not readily apparent from the drawings, a small clearance or spacing exists between the outer race 25a and the outer portion of disk 28 to permit relative movement therebetween without rubbing contact. However, because of the small spacing and the high speed of relative movement, the fluid leakage is not able to penetrate this passage and enter the antifriction bearing but is maintained out of contact with the bearing on the inner side of disk 28. It is believed that the high relative speed between the closely spaced apart surfaces of the disk 28 and outer race 25a creates a fluid boundary layer between these surfaces which serves as a barrier to the passage of leakage therebeyond.

It will be appreciated that as the fluid leakage present in annular cavity 40 contacts the inner side of circular disk 28, the centrifugal force imparted thereto because of the high rotational speed of the disk will deflect or sling the fluid leakage radially outwardly from the conduit 20 and away from the antifriction bearings.

In order to permit drainage of the thus deflected fluid leakage from the housing, three radially extending vent holes 41 are provided through the housing. Preferably, and as illustrated, the vent holes are positioned radially outwardly beyond the inner surface of the disk 28 so as to be positioned for receiving the fluid as it is directed radially outwardly from the conduit.

Although the rotary fluid joint has been illustrated herein as a straight coupling for interconnecting two pipes in axial alignment, it will be readily appreciated that various other configurations of rotary joints, such as elbows or tees for example, may be produced without departing from the principles of this invention.

In the drawings and specification, there has been set forth a preferred embodiment of the invention, and although specific terms are employed, they are used in a generic and descriptive sense only and not for purposes of limitation.

That which is claimed is:

1. A rotary fluid joint comprising
    a housing having a passageway therethrough for the flow of pressurized fluid,
    a conduit having an inner end portion thereof mounted within said housing in fluid communication with said passageway,
    bearing means mounted in said housing and surroundingly engaging said conduit permitting rotational movement of the conduit in said housing,
    sealing means positioned within said housing and cooperating with the housing and the inner end portion of said rotatable conduit preventing substantial leakage of pressurized fluid between the conduit and the housing,
    substantially flat, circular disk slinger means in said housing mounted on said rotatable conduit against relative movement thereto, said slinger means surroundingly engaging and extending radially outwardly from said conduit for deflecting radially outwardly from said conduit and away from said bearing means such fluid as may leak past said sealing means to thereby protect the bearing means from contact by the fluid, and
    said housing having at least one vent hole in said housing generally aligned with said circular disk slinger means receiving the radially deflected fluid and permitting drainage thereof from the housing.

2. A rotary fluid joint according to claim 1, wherein said disk is positioned closely adjacent said bearing means and has a radial extent overlapping at least the major portion of the radial extent of the bearing means to protectingly shield the bearing means from contact by the fluid leakage.

3. A rotary fluid joint according to claim 1, wherein said bearing means comprises an antifriction bearing having an inner race carried by said conduit and an outer race carried by said housing, and wherein said circular disk has the radially outermost portion thereof positioned in closely spaced relation with the outer race of said antifriction bearing for relative movement therebetween to thereby define a fluid boundary layer preventing passage of said fluid leakage into the antifriction bearing.

4. A rotary fluid joint according to claim 1, wherein said sealing means comprises first and second cooperating sealing elements respectively carried by said housing and said rotatable conduit and having opposed mutually contacting seal faces for preventing substantial leakage of pressurized fluid between the housing and the conduit.

5. A rotary fluid joint according to claim 4, wherein said first sealing element comprises a tubular member mounted for axial movement in said housing and having a radial flange at one end thereof defining a generally planar seal face thereon, the tubular member communicating at the flanged end thereof with said conduit and at the opposite end thereof with the fluid passageway in said housing, and wherein said conduit has a counterbore in the inner end thereof and said second sealing element comprises an annular sleeve mounted in said counterbore for rotation with said conduit and having an exposed end surface protruding beyond the inner end of the conduit and defining a generally planar seal face cooperating with the seal face of said first sealing element, and wherein spring means is provided cooperating with said housing and with said first sealing element for biasing the seal face thereof axially toward the seal face of said second sealing element for facilitating maintaining a tight seal therebetween and for compensating for any wear of the seal faces.

6. A rotary fluid joint according to claim 1, wherein said slinger means has the radially outermost portion thereof positioned in closely spaced relation with the outer race of said antifriction bearing means for relative movement therebetween to thereby define a fluid boundary layer preventing passage of said fluid leakage into the antifriction bearing means.

7. A rotary fluid joint according to claim 6, wherein said circular disk is positioned with one side thereof abutting the inner race of said antifriction bearing means for rotational movement therewith and wherein means are provided abutting the opposite side of the circular disk for retaining the disk and the antifriction bearing means on said cylindrical conduit.

8. A rotary fluid joint according to claim 7 wherein said housing has three vent holes extending radially outwardly therethrough from the enlarged annular inner wall of the housing, said vent holes being spaced substantially equal distances apart around the housing and positioned radially outwardly beyond said opposite side of said circular disk for receiving the radially deflected fluid and permitting drainage thereof from the housing.

9. A rotary fluid joint comprising a housing having an axial passageway therethrough for the flow of pressurized fluid and having an enlarged annular inner wall at one end thereof, means mounted for axial movement in said housing and defining a first generally planar seal surface surrounding said passageway and perpendicular to the axis thereof, an elongate generally cylindrical conduit having an inner end portion thereof positioned within the annular inner wall of said housing and in fluid communication with said passageway, means at the innermost end of said conduit defining a second generally planar seal surface cooperating with said first seal surface for preventing substantial leakage of pressurized fluid therebetween, means in said housing for biasing said first seal surface axially toward said second seal surface for facilitating maintaining a tight seal therebetween and for compensating for any wear of the seal surfaces, antifriction bearing means including an outer race mounted in the enlarged annular inner wall of said housing and an inner race surroundingly engaging said generally cylindrical conduit to permit rotational movement of the conduit in said housing, substantially flat, circular disk slinger means in said housing mounted on said rotatable conduit against relative movement thereto, said slinger means surroundingly engaging said conduit and extending radially outwardly therefrom between said cooperating seal surfaces and said antifriction bearing means for deflecting radially outwardly from said conduit such fluid as may leak past said seal surfaces to thereby protect the bearing means from contact by the fluid, and said housing having at least one vent hole extending radially outwardly from said circular disk slinger means for receiving the radially deflected fluid and permitting drainage thereof from the housing.

* * * * *

UNITED STATES PATENT OFFICE
CERTIFICATE OF CORRECTION

PATENT NO. : 3,889,983
DATED : June 17, 1975
INVENTOR(S) : Ronny R. Freize et al It is certified that error appears in the above-identified patent and that said Letters Patent are hereby corrected as shown below:

Column 2, Line 2, "eference" should be --reference--;

Column 3, Line 4, "with" should be --within--;

Column 3, Line 45, "aand" should be --and--;

Column 5, Line 7, "opposed" should be --opposing--.

Signed and Sealed this fourteenth Day of October 1975

[SEAL]

Attest:

RUTH C. MASON
Attesting Officer

C. MARSHALL DANN
Commissioner of Patents and Trademarks